June 23, 1964  E. HENRY-BIABAUD  3,138,003
WEAR OR PLAY TAKE-UP DEVICE FOR HYDRAULICALLY ACTUATED PARTS
Filed Feb. 8, 1963

United States Patent Office 3,138,003
Patented June 23, 1964

3,138,003
WEAR OR PLAY TAKE-UP DEVICE FOR HYDRAULICALLY ACTUATED PARTS
Edmond Henry-Biabaud, Paris, France, assignor to Societe Anonyme Andre Citroen, Paris, France
Filed Feb. 8, 1963, Ser. No. 257,287
Claims priority, application France Feb. 8, 1962
4 Claims. (Cl. 60—54.6)

Various methods and means have already been proposed for taking up wear or play in mechanisms of which typical examples are brakes, clutches, friction couplings, etc.

Conventional hydraulic brake systems equipping the majority of vehicles comprise as a rule a movable brake assembly actuated by pistons movable in one or a plurality of hydraulic receiving cylinders fed either from a master cylinder or from a pressure fluid distribution. In either case the action of hydraulic pressure in the receiving cylinders is produced by the driver through the usual control means such as brake pedal, lever, handle, etc.

When the hydraulic pressure is applied to the receivers, the movable brake assembly is pressed with a force proportional to said pressure against the surfaces to be braked, such as drums, discs, etc.

When the brake application ceases, that is, when the feed pressure drops to zero or a very low value, the aforesaid movable assembly tends to resume a released position either under the influence of return springs associated therewith or by the inherent elasticity of the assembly.

Now it is necessary to limit this return movement to avoid, at the next brake application, the demand for an excessive quantity of hydraulic fluid for actuating the movable brake assembly to its operative position. This requirement is inasmuch critical as the friction linings of the movable assembly wear out. This is the reason for the provision of so-called wear take-up devices in mechanisms of this character.

Hitherto known wear take up devices for braking systems consist of a number of parts the movements of which are attended by the reaction of spring and stop means. These mechanisms are generally complicated and therefore costly. Moreover, their adjustment is delicate and they prove cumbersome in the braking system and in certain case even in the compressed-fluid distribution system.

It is the essential object of this invention to provide a brake wear take up device of particularly simple design and construction.

Another object of the present invention resides in a brake wear take up device which is incorporated completely in the brake receiving cylinders and can be used without bringing any modifications whatsoever to the mechanical or hydraulic parts externally of these cylinders.

This brake wear take up device consists essentially of a small deformable capacity housed in the brake cylinder in front of the inlet port, said capacity communicating with the remaining portion of the inner volume of the cylinder through non-return means, and having a volume adapted to vary between constant minimum and maximum values.

The only requirement is that the difference between said minimum and maximum values of the volume of said small deformable capacity be equal to that portion of the inner volume of the brake cylinder which corresponds to the desired amplitude of release movement of the movable brake assembly with respect to the surface to be braked, so that said amplitude is maintained in the inoperative brake position irrespective of any wear or play that may have developed in the brake component elements during the preceding brake application.

The features and advantages of the present invention will appear more completely from the following description of a few typical forms of embodiment of the invention which is given by way of example with reference to the accompanying drawings, it being understood that changes in the precise embodiments of the invention herein disclosed may be made within the scope of what is claimed without departing from the spirit of the invention.

The device according to this invention is applicable inter alia to a brake cylinder 1 having its ends closed by two pistons 2 provided on their registering faces with piston cups 3. The wall of cylinder 1, for example intermediate its ends, has a radial feed port formed therein which opens into the inner cylindrical surface of the cylinder through a circular aperture 4.

Figure 1:
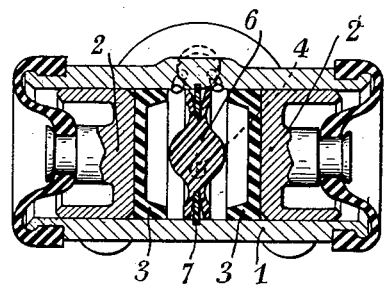
FIGURE 1 is an axial section showing the cylinder equipped with the brake wear take up device of this invention.
Figure 2:
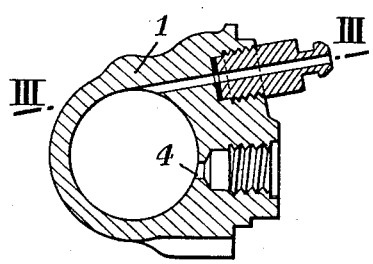
FIGURE 2 is a cross-section taken along the line II—II of FIG. 3, showing the fluid connections inside the cylinder with the compressed fluid distribution system.
Figure 3:
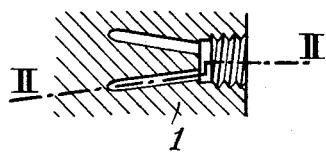
FIGURE 3 is a fragmentary section taken along the line III—III of FIG. 2 showing a detail.
Figure 4:
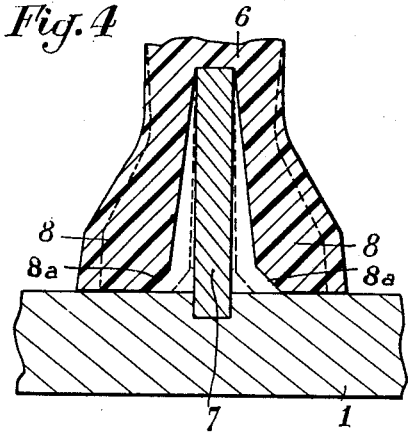
FIGURE 4 is another detail view showing on a considerably larger scale one portion of FIG. 1 to illustrate the position assumed by the brake wear take up device during a brake application.

This device consists of a resilient member 6 fitted in the cylinder 1 and retained therein by a fastening or stop member 7, such as a circlip or other suitable element, extending in the transverse plane coincident with the axis of the feed port 4. This resilient member 6 has its outer periphery divided into two circular lips 8 as shown more in detail in FIG. 4. Of course, if only one piston is fitted in the cylinder the resilient member 6 has only one circular lip.

This device operates as follows:

When fluid under pressure delivered to the cylinder through the port 4 flows into the space available under the lip or lips 8 of member 6 and the fluid pressure will raise the lip or lips relative to the inner wall of the cylinder 1. This pressure is transmitted to the piston 2 and causes the movable brake assembly to engage the corresponding surfaces to be braked and subsequently to bear more or less intensely against these surfaces according to the force exerted on the control member.

When the braking effort is released, the spring or other means provided for returning the brake assembly to its initial or release position moves the piston back and thus this piston tends to discharge the fluid from the cylinder. However, the shape of the circular lips 8 prevents this fluid from flowing out so that the return pressure will alter the shape of these lips and apply them against the stop member 7. Under these conditions, any escape of fluid is definitely prevented (see broken line position in FIG. 4).

It will be noted that this action is assisted by the specific shape of these lips 8. Thus, two small inner bevels 8a leave a small circular space registering with the fluid inlet port 4a in order to create an incipient fluid flow when the fluid pressure is restored.

Thus, it is sufficient to give the proper shape to the lips 8 of resilient member 6, in the released condition, for causing their backward movement due to the return pressure to move a fluid volume such that the piston recedes exactly to the extent necessary to move the brake drum shoes away from the surface to be braked to the desired extent which is the gap just sufficient to avoid their permanent frictional engagement with said surface. In most cases this gap corresponds to ten or twenty thousandths of an inch.

Figure 5:
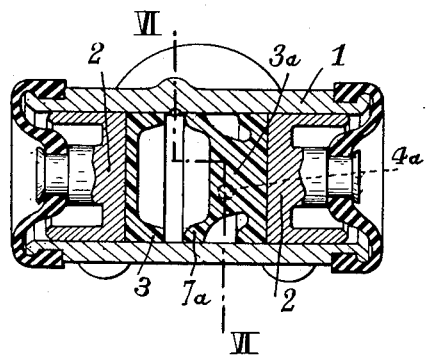
FIGURE 5 is similar to FIG. 1 and illustrates a modified embodiment of the brake wear take up device.
Figure 6:
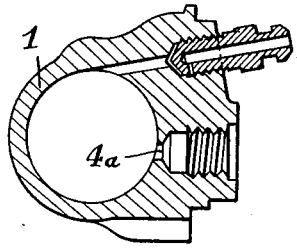
FIGURE 6 is similar to FIG. 2 and shows a section taken along the line VI—VI of FIG. 5.

Thus, whatever the wear produced during a brake application may be, after any brake application the device will resume the position in which the lips 8 engage completely the stop member 7. When the brakes are applied the next time the hydraulic fluid penetrating into the interstices left between the lips 8 and stop member 7 and flowing to the remaining portion of the cylinder capacity will be maintained in a condition of pressure equilibrium with respect to this capacity. Therefore, the volume of the gaps occurring upon completion of a brake application corresponds to the released or expanded shape of the resilient member 6, that is, to a constant volume. It is this constant volume that is ejected from cylinder 1 after each brake application from the position in which the movable brake assembly contacts the braked surfaces. FIGS. 5 and 6 illustrate a modified embodiment wherein no separate resilient member 6 is provided for carrying the lips 8.

In this alternate embodiment a lip 7a is carried by one of the piston cups designed accordingly as shown at 3a. The feed port 4a opens into the circular gap left between the cup portions 3a and 7a. When the fluid pressure is applied to the cylinder this pressure is received by the cup 3a directly. The opposite piston cup 3 receives the pressure as a consequence of the deformation of lip 7a, as in the preceding embodiment, until the brake shoe linings engage the brake drum surface. When the brake application ceases, the shape of the piston cup 3a is altered by the return pressure and the lip 7a recedes back until it engages a stop or closes the port 4a. At this time the volume contemplated has been expelled and the pistons 2 have receded through a total distance equal to twice the unitary play. Then, as the hydraulic fluid contained in the cylinder between the piston cups 3 cannot escape, the return movement is stopped.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A hydraulic actuator of the application type, notably for brakes, comprising a cylinder formed with an orifice for delivering compressed hydraulic fluid thereto and discharging said fluid therefrom, at least one piston having an inner end slidably fitted in, and in sealing engagement with, the bore of said cylinder and an outer end controlling the desired application when said compressed hydraulic fluid is delivered to said cylinder and permitting the release of said application when said orifice acts as an exhaust port, and an elastic diaphragm mounted transversely in said bore with its peripheral edge engaging said bore and formed with a groove providing in said cylinder, against the wall of said bore, an annular chamber coincident with the inner end of said orifice, said elastic diaphragm being shaped to permit the flow of said hydraulic fluid from said annular chamber into the cylinder and to prevent said fluid from flowing from said cylinder into said annular chamber.

2. A hydraulic actuator of the application type, notably for brakes, as set forth in claim 1, wherein the volume of said annular chamber, in the non-deformed condition of said elastic diaphragm and therefore during the passage of hydraulic fluid from said chamber to said cylinder, is equal to the volume of hydraulic fluid to be discharged through said cylinder orifice during the release movement period in order to limit to the desired value the amplitude of this release movement.

3. A hydraulic actuator of the application type, notably for brakes, comprising a cylinder formed with an orifice for supplying compressed hydraulic fluid thereto and discharging said fluid therefrom, a pair of pistons each having an inner end slidably engaging and in fluid-tight relationship with the bore of said cylinder and an outer end controlling the desired application effort when said compressed hydraulic fluid is delivered to said cylinder, said pair of pistons permitting the release of the application effort when said orifice is acting as an exhaust port, a rigid annular mounting element fitted in the inner wall of said cylinder and extending through said orifice, and an elastic disc formed with a peripheral circular groove, said disc being mounted across said cylinder by having said rigid annular mounting element engaged in said groove so as to limit with the inner wall of said cylinder an annular chamber shaped to permit the flow of any hydraulic fluid trapped in said chamber from said chamber into said cylinder while preventing said hydraulic fluid from flowing from said cylinder into said chamber.

4. A hydraulic actuator of the application type, notably for brakes, comprising a cylinder formed with an orifice for delivering compressed hydraulic fluid thereto and for exhausting said fluid therefrom, a pair of pistons each having an inner end slidably engaged in the bore of said cylinder and an outer end controlling the desired application when said compressed fluid is delivered to said cylinder and permitting the release of the application effort when said orifice is acting as an exhaust port, a pair of elastic packings carried by the inner ends of said pistons to ensure the fluid-tight sliding movements of said inner ends in said cylinder, one of said packings having a circular groove formed on its peripheral edge which communicates with said orifice, the edge portion on either side of said groove bounding with said cylinder bore an annular chamber shaped to permit the escape of any hydraulic fluid trapped in said annular chamber toward the inner space of said cylinder while preventing the reverse flow of hydraulic fluid contained in said cylinder into said annular chamber.

References Cited in the file of this patent

UNITED STATES PATENTS

| | | |
|---|---|---|
| 2,189,134 | Chard | Feb. 6, 1940 |
| 2,234,689 | Chard | Mar. 11, 1941 |
| 2,240,792 | Liebreich | May 6, 1941 |
| 2,513,015 | Fike | June 27, 1950 |
| 2,815,830 | Oswalt | Dec. 10, 1957 |
| 3,011,315 | Menichello | Dec. 5, 1961 |